United States Patent
Ragnhult et al.

(10) Patent No.: US 11,637,880 B2
(45) Date of Patent: Apr. 25, 2023

(54) DEVICE DISCOVERY FOR SOCIAL PLAYBACK

(71) Applicant: Spotify AB, Stockholm (SE)

(72) Inventors: Mikael Ragnhult, Fjärås (SE); Rifat Ordulu, Stockholm (SE); Aron Manucheri, Gothenburg (SE); Kenny Christer Öberg Falguera, Gothenburg (SE); Cecilia Humlelu, Stockholm (SE); Gustav Mattias Over Bergström, Gothenburg (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/313,797

(22) Filed: May 6, 2021

(65) Prior Publication Data

US 2022/0360614 A1 Nov. 10, 2022

(51) Int. Cl.
*H04L 65/60* (2022.01)
*H04W 4/80* (2018.01)

(52) U.S. Cl.
CPC .............. *H04L 65/60* (2013.01); *H04W 4/80* (2018.02)

(58) Field of Classification Search
CPC ................ H04L 65/1069; H04L 65/60; H04L 2012/2849; H04L 51/52; H04L 65/1089; H04L 65/1093; H04L 65/61; H04L 51/10; H04L 67/51; H04L 12/2809; H04L 12/2812; H04L 63/104; H04L 65/1066; H04L 65/1094

See application file for complete search history.

(56) References Cited

U.S. PATENT DOCUMENTS

| | | | |
|---|---|---|---|
| 7,996,566 B1* | 8/2011 | Sylvain | H04N 7/15 715/201 |
| 10,154,122 B1* | 12/2018 | Coburn, IV | H04L 12/1822 |
| 10,440,075 B2 | 10/2019 | Garnark et al. | |
| 11,082,742 B2* | 8/2021 | Hernejärvi | H04N 21/485 |
| 2010/0293264 A1* | 11/2010 | Ramsay | H04L 12/2809 709/223 |
| 2013/0117693 A1* | 5/2013 | Anderson | H04L 65/1093 715/753 |
| 2013/0159126 A1* | 6/2013 | Elkady | H04L 65/612 705/26.1 |
| 2013/0339452 A1* | 12/2013 | Shaikh | G06Q 50/01 709/205 |
| 2015/0172757 A1* | 6/2015 | Katie | H04N 21/43637 725/81 |

(Continued)

OTHER PUBLICATIONS

"Add music to your queue to play next on your iPhone, iPad, iPod touch, or Android device", obtained online on Mar. 26, 2021 at: https://support.apple.com/en-us/HT208383, 4 pages.

(Continued)

*Primary Examiner* — David R Lazaro
(74) *Attorney, Agent, or Firm* — Merchant & Gould P.C.

(57) ABSTRACT

A system for device discovery for social playback is disclosed. The system operates to connect a host media playback device to a media output device and broadcast a social playback session to guest media playback devices. Upon joining a social playback session, a guest media playback device may control the media playback at the host media playback device. Where the media output for the social playback session is provided by the media output device.

21 Claims, 15 Drawing Sheets

(56) References Cited

U.S. PATENT DOCUMENTS

| | | | |
|---|---|---|---|
| 2015/0222680 A1* | 8/2015 | Grover | H04W 4/48 709/204 |
| 2015/0312299 A1* | 10/2015 | Chen | H04N 21/252 709/219 |
| 2015/0319288 A1 | 11/2015 | Kahn et al. | |
| 2015/0373069 A1* | 12/2015 | Rajapakse | H04L 65/611 709/219 |
| 2016/0004845 A1* | 1/2016 | Choudhury | H04W 4/021 726/28 |
| 2016/0191590 A1 | 6/2016 | Ahlin et al. | |
| 2016/0330794 A1* | 11/2016 | Ozcan | H04W 4/80 |
| 2016/0378417 A1* | 12/2016 | Kenjalkar | G06F 3/0482 345/2.2 |
| 2017/0034263 A1* | 2/2017 | Archambault | G06F 3/165 |
| 2017/0124664 A1* | 5/2017 | Savenok | H04L 67/1074 |
| 2017/0289202 A1* | 10/2017 | Krasadakis | H04L 67/06 |
| 2018/0103499 A1* | 4/2018 | Lee | H04W 76/15 |
| 2018/0293959 A1* | 10/2018 | Monga | G06F 3/1446 |
| 2019/0306904 A1 | 10/2019 | Iyer et al. | |
| 2019/0394558 A1 | 12/2019 | Schobel et al. | |
| 2020/0267446 A1* | 8/2020 | Hernejärvi | H04N 21/64784 |
| 2020/0287948 A1 | 9/2020 | O'Driscoll et al. | |
| 2021/0141589 A1* | 5/2021 | Taylor | H04L 65/1069 |
| 2021/0288932 A1* | 9/2021 | Lind | G06Q 50/184 |
| 2021/0329337 A1* | 10/2021 | Hernejärvi | H04N 21/64784 |
| 2021/0352122 A1* | 11/2021 | Broberg | H04L 65/611 |
| 2021/0409830 A1* | 12/2021 | Broberg | H04N 21/4788 |
| 2022/0360614 A1* | 11/2022 | Ragnhult | H04N 21/4104 |

OTHER PUBLICATIONS

Amazon Music Streaming with Alexa Cast, located online on Apr. 28, 2022 at: https://web.archive.org/web/20201130134344/https://www.amazon.com/b?ie=UTF8&node=17910796011, 3 [ages.

European Extended Search Report in Application 21202879.9, dated Mar. 29, 2022, 9 pages.

Keller, Joseph, "Mastering Apple Music: AppleMusic in iOS 11 FAQ: Everything you need to know", Jul. 5, 2017, obtained online on Mar. 26, 2021 at: https://www.imore.com/apple-music-ios-11-faq-everything-you-need-know, 11 pages.

Screenshots of video "Introducing Alexa Cast", embedded in: https://web.archive.org/web/20201130134344/https://www.amazon.com/b?ie=UTF8&node=17910796011From: https://web.archive.org/web/20201201023306im_/https://images-na.ssl-images-amazon.com/images/G/01/digital/music/merch/2018/WeeklyBuild/082518/castingHowTo727.gif, 7 pages.

* cited by examiner

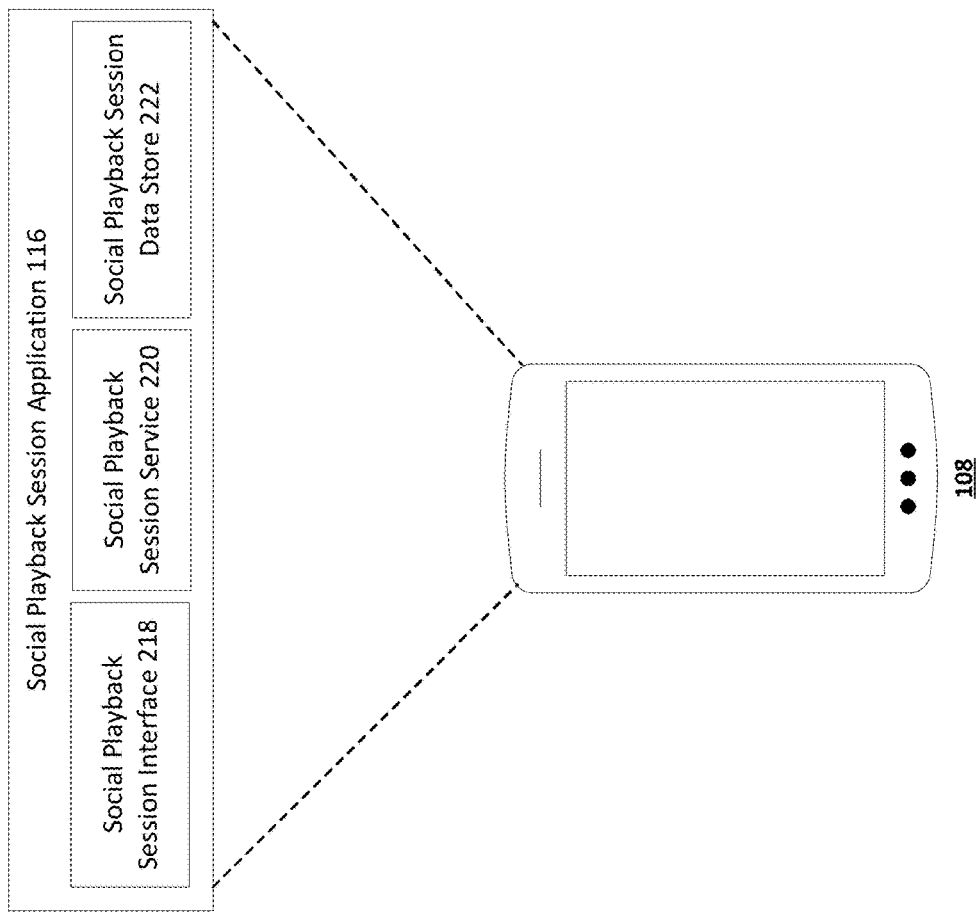

DEVICE DISCOVERY FOR SOCIAL PLAYBACK

BACKGROUND

Bluetooth® speakers typically pair with a media playback device to provide audio output. The Bluetooth® speaker may have a discovery mode and a paired mode. While in discovery mode the Bluetooth® speaker may connect with a media playback device which has Bluetooth® capabilities. However, when the Bluetooth® speaker is paired to the media playback device other devices are unable to discover the Bluetooth® speaker. Accordingly, only the media playback device is able to control the audio output. Similar limitations for controlling media output also exist with other wireless speaker protocols, wired speakers, and other media output devices.

SUMMARY

In general terms, this disclosure is directed to device discovery for joint media playback control. In one possible configuration and by non-limiting example, a media playback device is configured to broadcast a message which allows other devices to discover and join a social playback session. Various aspects are described in this disclosure, which include, but are not limited to, the following aspects.

One aspect is a method of controlling a media output device, the method comprising: connecting a first media playback device to the media output device, initiating, from the first media playback device, a social playback session, controlling the media output device to o a media content item, broadcasting a message for the social playback session to permit a second media playback device to discover and join the social playback session, and adjusting at least one playback control based on commands from the second media playback device.

In some embodiments, the broadcasting is transmitted through wireless communication. In some embodiments the wireless communication is performed using a wireless communication protocol. Examples of wireless communication protocols include Bluetooth® Low Energy (BLE) and Wi-Fi®, and combinations thereof. Therefore, in some embodiments the broadcasting is through BLE, Wi-Fi®, or combinations thereof.

Another aspect is a system for controlling a media output device, the system comprising: a media output device, and a first media playback device including a memory storage device, the memory storage device storing instructions that, when executed by the computing device, cause the computing device to: connect the first media playback device to the media output device, initiate a social playback session, control the media output device to output a media content item, broadcast a message for the social playback session to permit a second media playback device to discover and join the social playback session, and adjust at least one playback control based on commands from the second media playback device.

A further aspect is a method of controlling a media output device, the method comprising: receiving a request to generate a social playback session from a first media playback device, wherein the first media playback device is connected to the media output device, generating the social playback session and a session ID, sending the session ID to the first device allowing the first device to broadcast a message which includes the session ID, receiving a request, including the session ID, to join the social playback session from a second media playback device after the second media playback device discovers the message, and receiving commands from the second media playback device including at least one playback control and sending the commands to the first media playback device causing the first media playback device to adjust the at least one playback control.

BRIEF DESCRIPTION OF THE DRAWINGS

Various embodiments will be described in detail with reference to the drawings, wherein like reference numerals represent like parts and assemblies throughout the several views.

FIG. 15 illustrates an example media playback device executing a social playback session application.

DETAILED DESCRIPTION

Figure 1:
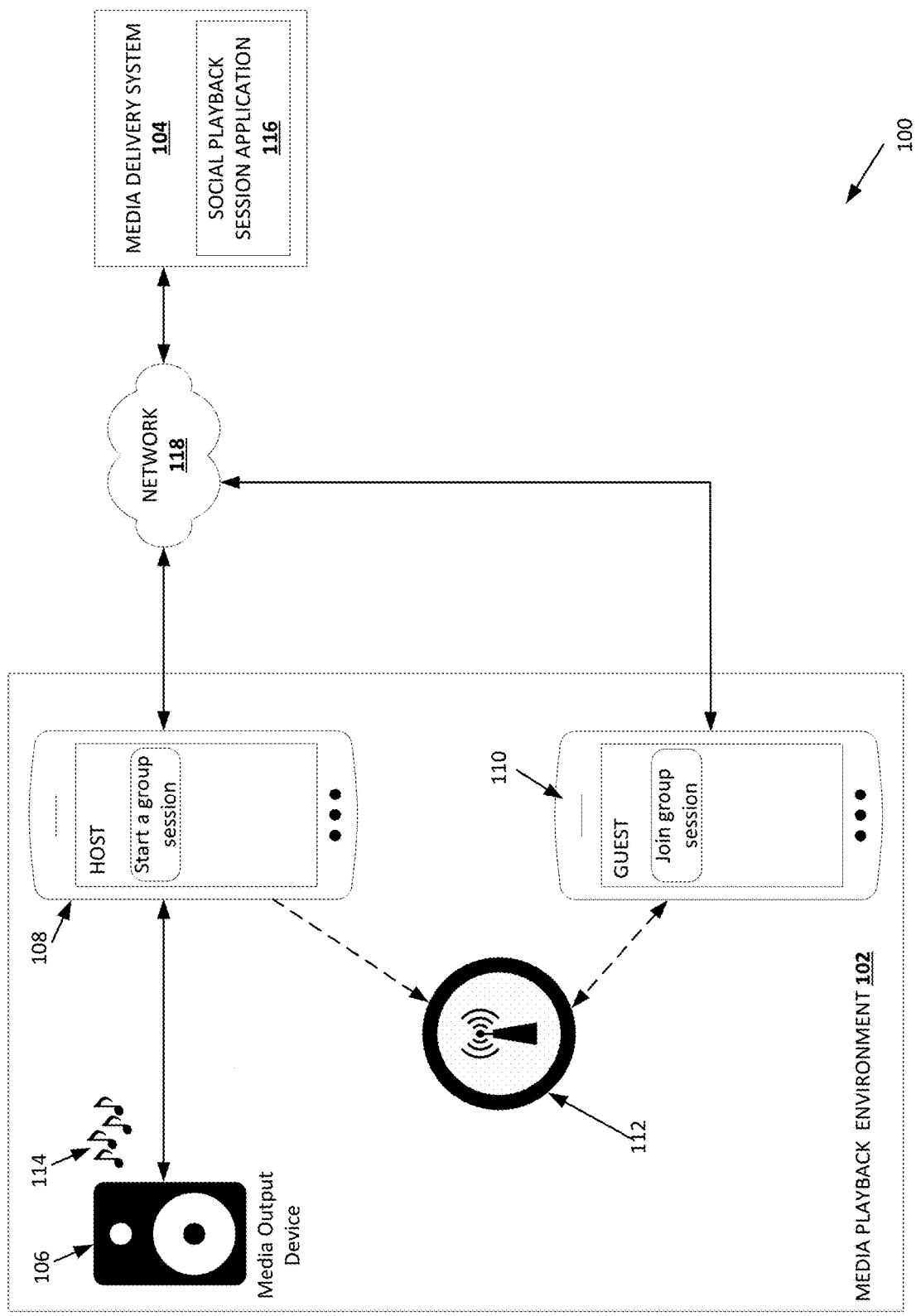
FIG. 1 illustrates an example device discovery for a social playback system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates an example device discovery for social playback system 100. The system 100 includes a media playback environment 102 and a media delivery system 104. The media playback environment 102 includes a media output device 106, a host media playback device 108, and a guest media playback device 110. The host media playback device 108 broadcasts a message 112. The media output device 106 is connected to the host media playback device 108 to provide media content output 114. The media delivery system 104 includes a social playback session application 116. A network 118 connects the host media playback device 108, and the guest media playback device 110 to the media delivery system 104.

The example system 100 includes a media playback environment 102. The media playback environment 102 includes any area where a group of users can experience the media content output 114. For example, an area where users can listen to music or view video content. In some examples, the media playback environment 102 is defined by the area where a guest device is in range to discover the message 112. In one typical example, the media playback environment 102 can be a room in a building or house. Other non-limiting examples include: an outdoor area, an event venue, a car, and a boat.

The media playback environment 102 includes a media output device 106. Examples of media output device include speakers, TVs, tablets, and other devices which can output media content. In the example shown, the media output device 106 is a wireless speaker. The media output device 106 is configured to connect the host media playback device 108 via a wireless communication protocol. In some examples, the media output device 106 uses a Bluetooth® protocol to connect with a media playback device. In some embodiments, the media output device 106 is configured to connect to the host media playback device 108 using a communication cable. For example, a wired speaker can use an AUX cord or a USB cable to connect to the host media playback device 108. In some examples, once the media output device 106 is connected to the host media playback device 108 other playback devices are unable to discover or connect to the media output device 106.

The media output device 106 generates media content output 114 which is received from the host media playback device 108. The host media playback device 108 plays the media output and sends the media data to the media output device 106 which provides the media content output 114 in the media playback environment 102. Non-limiting examples of media content output 114 include songs, albums, podcasts, other types of audio content, video content, audio-visual content, and portions or combinations thereof.

The media playback environment 102 includes a host media playback device 108. The host media playback device 108 operates to play the media content output 114. In some embodiments, the media content output 114 is provided by the media delivery system 104 and is transmitted to the host media playback device 108 over the network 118. The host media playback device 108 is connected to the media output device 106 via a wireless communication protocol to output the media content output 114 at the media output device 106. In some examples, the host media playback device 108 includes a communication interface module configured to allow the host media playback device 108 to use one or more wireless communication protocols to connect with the media output device 106, the media delivery system 104, and broadcast a message 112. An example host media playback device 108 is illustrated and described in FIG. 2.

The host media playback device 108 broadcasts a message 112. The message 112 allows other devices in the proximity to discover the host media playback device 108. In some examples, the scope of the proximity is defined by the communication range of a wireless standard, such as the communication range of the Bluetooth® standard. In some embodiments, the message 112 is a Bluetooth® Low Energy (BLE) beacon. In these embodiments, other Bluetooth® enabled devices within range of the host media playback device 108 can discover the beacon. In other examples, the message 112 may be broadcast using other wireless protocols, such as Wi-Fi®. For example, the message can be broadcast using multicast DNS (mDNS) over Wi-Fi®. In other examples a message 112 is broadcast using BLE and another message 112 is broadcast using Wi-Fi®. The message 112 provides information which allows other devices to discover the social playback session.

The media playback environment 102 includes a guest media playback device 110. The guest media playback device 110 is similar to the host media playback device 108. The guest media playback device 110 is typically used by a guest user. The guest media playback device 110 also includes communication interface modules configured to allow the host media playback device 108 to use one or more wireless communication protocols to connect with the media delivery system 104 and discover the message 112. The example shown includes one guest media playback device 110, however, the system 100 can include any number of guest media playback devices.

The example system 100 includes a media delivery system 104. The media delivery system 104 operates to provide the media content output 114 to the host media playback device 108. The media delivery system 104 also operates to connect with the guest media playback device 110. An example of the media delivery system 104 is illustrated and described in FIG. 2.

The media delivery system 104 includes a social playback session application 116. The social playback session application 116 manages a social playback session across the connected media playback devices. The social playback session application 116 is described in more detail in FIG. 2.

The system 100 includes a network 118. The network 118 connects the media delivery system 104 to the host media playback device 108 and the guest media playback device 110. In some examples, the network 118 is a public network, such as the Internet. In example embodiments, the network 118 may connect with media playback devices through a Wi-Fi® network or a cellular network.

Figure 2:
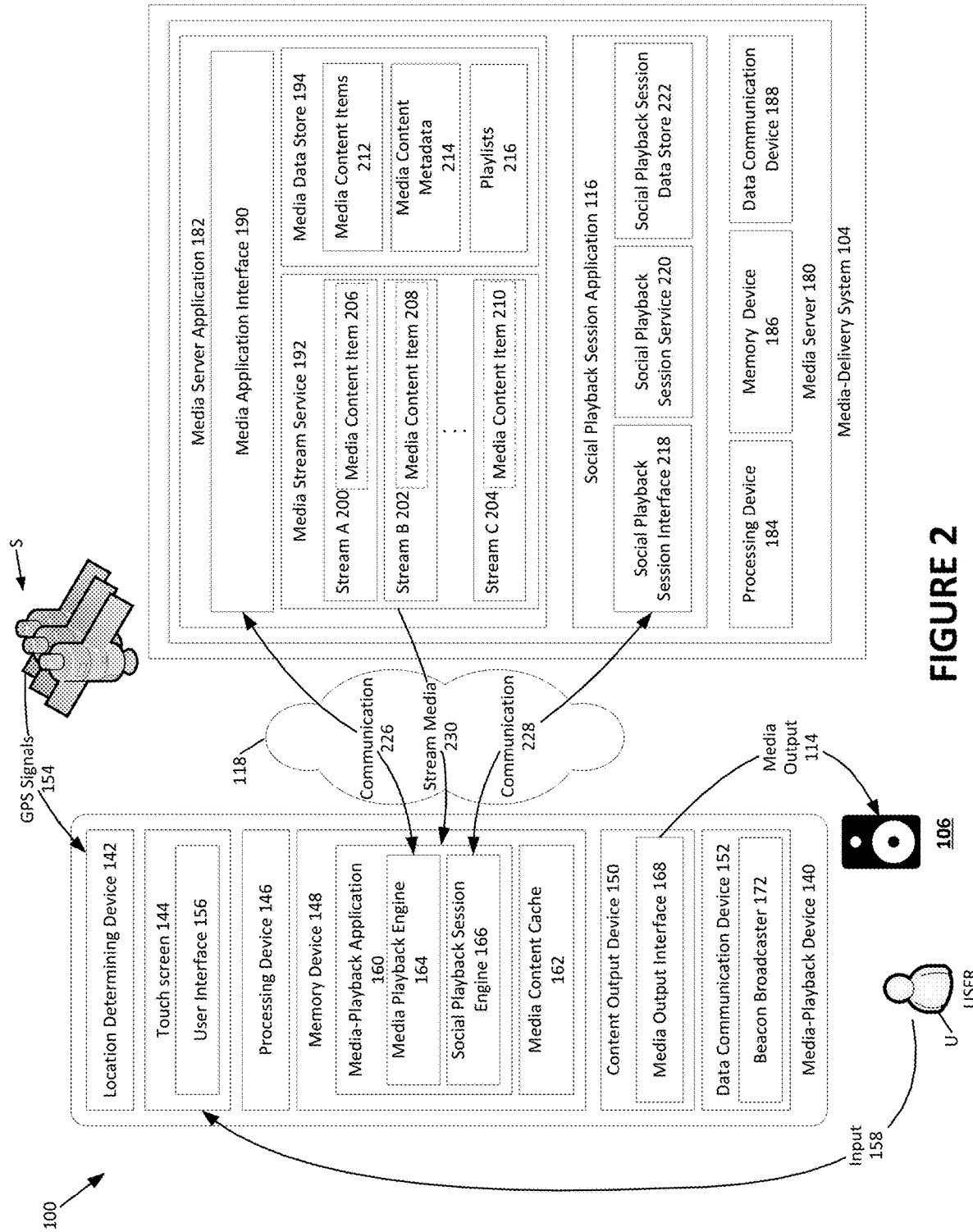
FIG. 2 is a schematic illustration of an example device discovery for a social playback system.

FIG. 2 is a schematic illustration of an example device discovery for a social playback system 100. The system 100 includes a media playback device 140, which communicates with the media delivery system 104 via the network 118. Also shown are the user U and satellites S.

The media playback device is an example of the host media playback device 108 or the guest media playback device 110, as shown in FIG. 1. The media playback device 140 plays media content items. In some embodiments, the media playback device 140 plays media content items that are provided (e.g., streamed, transmitted, etc.) by a system external to the media playback device 140 such as the media delivery system 104, another system, or a peer device. Alternatively, in some embodiments, the media playback device 140 plays media content items stored locally on the media playback device 140. Further, in at least some embodiments, the media playback device 140 plays media content items that are stored locally as well as media content items provided by other systems.

In some embodiments, the media playback device 140 is a portable computing device. Such a portable computing device includes a handheld entertainment device, smartphone, tablet, watch, wearable device, or any other type of device capable of playing media content. In other embodiments, the media playback device 140 is a laptop computer, desktop computer, or other computing consoles.

In at least some embodiments, the media playback device 140 includes a location-determining device 142, a touch screen 144, a processing device 146, a memory device 148, a content output device 150, and a data communication device 152. Other embodiments may include additional, different, or fewer components.

The location-determining device 142 is a device that determines the location of the media playback device 140. In some embodiments, the location-determining device 142 uses one or more of the following technologies: Global Positioning System (GPS) technology which may receive GPS signals 154 from satellites S, cellular triangulation technology, network-based location identification technology, Wi-Fi® positioning systems technology, and combinations thereof.

The touch screen 144 operates to receive an input 158 from a selector (e.g., a finger, stylus etc.) controlled by the user U. In some embodiments, the touch screen 144 operates as both a display device and a user input device. In some embodiments, the touch screen 144 detects inputs based on one or both of touches and near-touches. In some embodiments, the touch screen 144 displays a user interface 156 for interacting with the media playback device 140. As noted above, some embodiments do not include a touch screen 144. Some embodiments include a display device and one or more separate user interface devices. Further, some embodiments do not include a display device.

In some embodiments, the processing device 146 comprises one or more central processing units (CPU). In other embodiments, the processing device 146 additionally or alternatively includes one or more digital signal processors, field-programmable gate arrays, or other electronic circuits.

The memory device 148 typically includes at least some form of computer-readable media. Computer readable media includes any available media that can be accessed by the media playback device 140. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, Blueray® discs, digital versatile discs or other optical storage, magnetic cassettes, magnetic tape, magnetic disk storage or other magnetic storage devices, or any other medium that can be used to store the desired information and that can be accessed by the media playback device 140. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 148 operates to store data and instructions. In some embodiments, the memory device 148 stores instructions for a media playback application 160 and a media content cache 162.

The memory device 148 includes a media playback application 160. In some embodiments, the media playback application 160 comprises a media playback engine 164 and a social playback session engine 166.

Some embodiments of the media playback application 160 include a media playback engine 164. The media playback engine 164 operates to play media content to the user. As described herein, the media playback engine 164 is configured to communicate with the media delivery system 104 to receive on or more tracks (for example, through the stream media channel 230). In other embodiments, the media playback engine 164 is configured to play media content that is locally stored in the media playback device 140.

In some embodiments, the media playback engine 164 operates to retrieve one or more tracks that either locally stored in the media playback device 140 or remotely stored in the media delivery system 104. In some embodiments, the media playback engine 164 is configured to send a request to the media delivery system 104 for tracks and receive information about such tracks for playback.

In some embodiments, the media playback application 160 also includes a social playback session engine 166. The social playback session engine 166 operates to manage a social playback session at the media playback device 140. For example, a user may provide inputs at the user interface 156 to initiate a social playback session. In some embodiments, the media playback device which initiates the social playback session will act as the host media playback device (for example, host media playback device 108, as illustrated in FIG. 1). In some examples, the social playback session engine 166 will communicate with the media delivery system 104 to generate a social playback session ID. In other embodiments, the social playback session engine 166 will generate a social playback session ID. The social playback session engine 166 further operates with the message broadcaster 172 to broadcast a message that is discoverable by other media playback devices in range of the message. The social playback session engine is also configured to manage the social playback session by choosing a media content item to play, setting audio settings, video settings, pausing the media content output, and other controls for a social playback session. Similarly, a guest media playback device (for example, the guest media playback device 110, as illustrated in FIG. 1) include a social playback session engine 166 which operates to discover the social listening session via a broadcasted message and join the social playback session.

Once the guest media playback device joins a social playback session the guest media playback device may control the session including controlling the media output. Examples of controlling the media output include: (1) a volume control; (2) a pause media content item control; (3) a play media content item control; (4) a media content item selection; (5) a media content item addition to a queue; (6) a next song control; (7) a previous song control; and (8) a playback context control. In other examples, the guest media playback device may add or remove participants from the session, end the session, leave the session, etc.

In some examples, the guest media playback device will have the same controls as the host media playback device. However, in other examples, the guest media playback device may not have access to certain controls. For example, the host media playback device may be the only device which is allowed to change the output volume.

Some embodiments of the memory device 148 also include a media content cache 162. The media content cache 162 stores media content items, such as media content items that have been previously received from the media delivery system 104. The media content items stored in the media content cache 162 can be stored in an encrypted or unencrypted format. The media content cache 162 can also store metadata about media-content items such as title, artist name, album name, length, genre, mood, era, etc. The media content cache 162 can also store playback information about the media content items, such as the number of times the user has requested to playback the media content item or the current location of playback (e.g., when the media content item is an audiobook, podcast, movie, or the like for which a user may wish to resume playback).

The content output device 150 operates to output media content. In some embodiments, the content output device 150 generates the media content output 114 for the user(s).

The content output device 150 includes an external media output interface 168. The external media output interface 168 is configured to connect the media playback device 140 to another system having one or more media output devices, such as a portable speaker or a vehicle entertainment system, so that the media content output 114 is generated via the media output device of the other system external to the media playback device 140. Examples of the external media output interface 168 includes an audio output jack, a USB port, a Bluetooth® transmitter, a display panel, and a video output jack. Other embodiments are possible as well. In the one example, the external media output interface 168 interfaces with a speaker using a wireless protocol.

The data communication device 152 operates to enable the media playback device 140 to communicate with one or more computing devices over one or more networks, such as the network 118. For example, the data communication device 152 is configured to communicate with the media delivery system 104 and receive media content from the media delivery system 104 at least partially via the network 118. The data communication device 152 can be a network interface of various types which connects the media playback device 140 to the network 118. Examples of the data communication device 152 include wired network interfaces and wireless network interfaces. Wireless network interfaces can include or be implemented with technologies including infrared technology, BLUETOOTH® wireless technology, Bluetooth® low energy technology, 802.11a/b/g/n/ac technology, cellular technology, or radio frequency interface technology, among others. Examples of cellular network technologies include LTE, UMTS, CDMA2000, GSM, cellular digital packet data (CDPD), and MOBITEX.

In some embodiments, the data communication device operates with a message broadcaster 172. The message broadcaster 172 transmits a message which allows other devices to discover the media playback device 140. In the typical example, the message broadcaster 172 transmits a message over a wireless network such as a Bluetooth® Low Energy network, a Wi-Fi® network, or both. For example, the message broadcaster 172 can broadcast a beacon using BLE technology or broadcast a message using mDNS technology over a Wi-Fi® network.

The system 100 further includes a media delivery system 104. The media delivery system 104 comprises one or more computing devices and provides media content items to the media playback device 140 and, in some embodiments, other media playback devices as well. The media delivery system 104 includes a media server 180. Although FIG. 2 shows a single media server 180, some embodiments include multiple media servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services (e.g., services to enhance media content playback during travel, etc.). Various combinations thereof are possible as well.

The media server 180 transmits stream media to media playback devices such as the media playback device 140. In some embodiments, the media server 180 includes a media server application 182, a social playback session application 116, a processing device 184, a memory device 186, and a data communication device 188. The processing device 184, memory device 186, and the data communication device 188 may be similar to the processing device 146, memory device 148, and the data communication device 152 respectively, which have each been previously described.

In some embodiments, the media server application 182 streams music or other audio, video, or other forms of media content. The media server application 182 includes a media stream service 192, a media data store 194, and a media application interface 190. The media stream service 192 operates to buffer media content such as media content items 206, 208, and 210, for streaming to one or more streams 200, 202, and 204. The streams are sent to one or more media playback devices over a stream media channel 230 over the network 118.

The media application interface 190 can receive requests or other communication from media playback devices or other systems, to retrieve media content items from the media server 180. In some examples, the media application interface 190 operates to establish a communication channel 226 with one or more media playback devices over the network 118.

In some embodiments, the media data store 194 stores media content items 212, media content metadata 214, and playlists 216. The media data store 194 may comprise one or more databases and file systems. Other embodiments are possible as well. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212 and. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. The playlists 216 may include user-created playlists, which may be available to a particular user, a group of users, or to the public.

The social playback session application 116 operates to manage a social playback session. The social playback session application 116 includes a social playback session interface 218, a social playback session service 220 and a social playback session data store 222.

The social playback session interface 218 receives requests or other communications from media playback devices or other systems, to retrieve social playback information from the media server 180. The social playback session interface 218 also sends communications to media playback devices to sync the social playback session across the devices in the social playback session. In some examples, the social playback session interface 218 may establish a communication channel 228 with one or more media playback devices over the network 118, such as the internet. For example, the network 118 includes access from a Wi-Fi® network, or access from a cellular network. In some embodiments the social playback session interface 218 may be included with the media application interface 190.

The social playback session service 220 operates to manage a social playback session. In some examples managing a social playback session includes generating a social playback session ID and marking a social playback session as available for guest media playback devices to join. The social playback session can also enable guests to join the social playback session, remove a guest from a session, or allow a guest to leave the session. In some embodiments, the social playback session service 220 performs some of or all of the authentication process for a guest media playback device requesting to join a social playback session. For example, the social playback session service 220 may generate a social playback session ID and manage media playback devices requesting to join the social playback session. The social playback session service 220 can also send updates to all users regarding the social session. For example, the social playback session service 220 can send an update if someone has joined the session, if someone leaves the session, if a user is kicked, if a user leaves a session, if a host ends a session, or other related updates.

In some embodiments the social playback session service 220 creates a session associated with the host user's account. The social playback session service 220 will then add guests to the session associated with the host user's account. Once the social playback session is created the playback control of the session goes through a playback service.

In some embodiments, playback service receives messages for controlling the media output of the host media playback device. Based on the configurations of the social playback session the playback service sends instructions which modify the playback on the host media playback device. In some examples, the playback service will sync the social playback session across devices to assist each device in providing users with the current status of the social playback session. For example, the playback service sends updates to each device in the social playback session. Updates include changes to the output volume, current song, and a current queue list of songs. By syncing each device, the playback service can ensure that each user is viewing the updated information about a social playback session.

The social playback session data store 222 stores information related to one or more social playback sessions. Examples of information include: session IDs, wireless media output device IDs, media-play back device IDs (for example, the device IDs for the devices in the social playback session), social playback session permissions, social playback session queue data, and audio settings.

Figure 3:
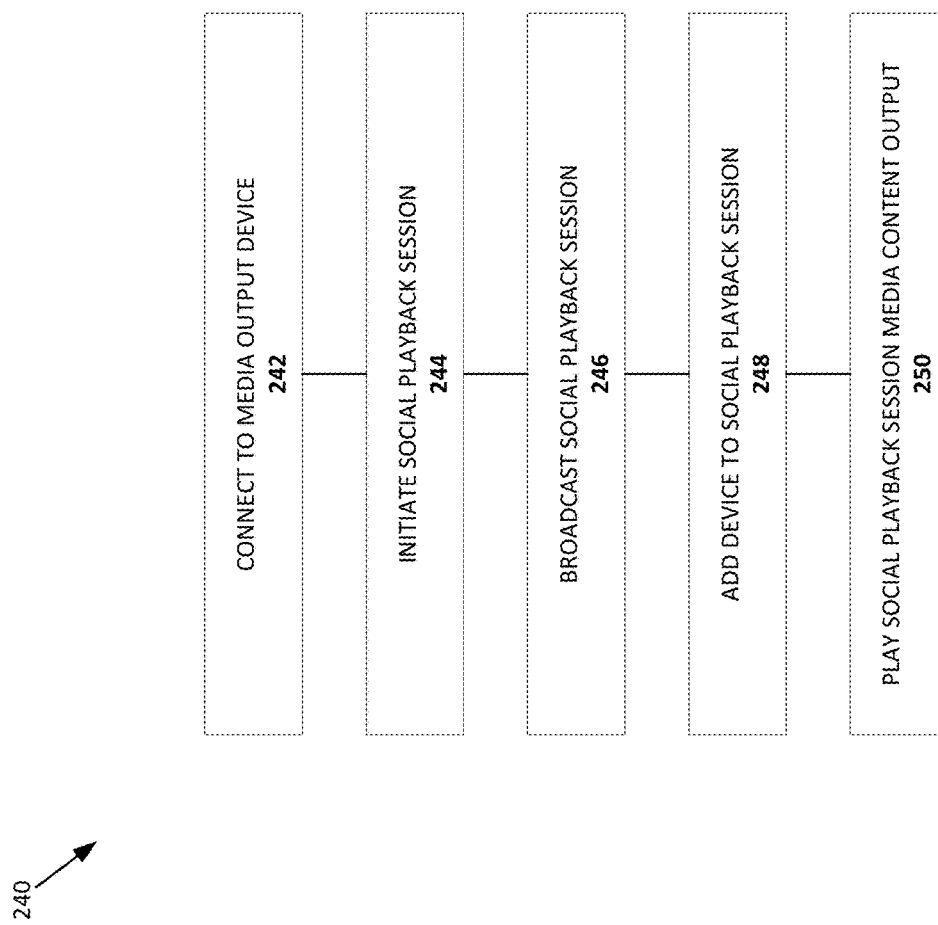
FIG. 3. illustrates an example method for joining a device to a social playback session.

FIG. 3. illustrates an example method 240 for joining a device to a social playback session. In some examples, the method 240 is performed on the host media playback device 108 as described in FIG. 1. The method 240 performs the operations 242, 244, 246, 248, and 250.

Figure 4:
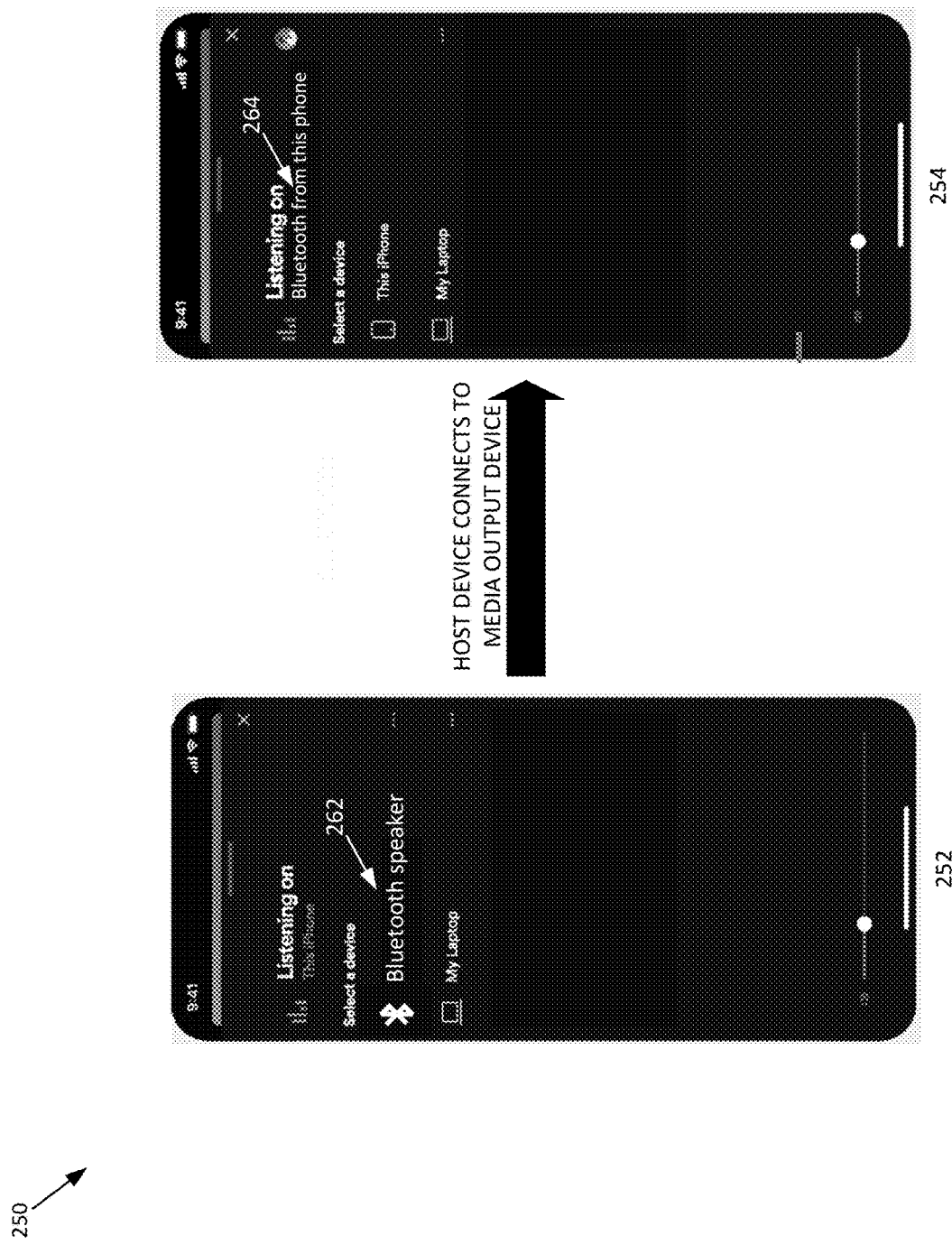
FIG. 4 illustrates example user interfaces for connecting a device to a media output device.

The operation 242 connects the host media playback device to the media output device. In some embodiments, the operation 242 includes setting a Bluetooth® speaker to a discoverable mode and pairing the host media playback device with the speaker. Additional embodiments include similar steps for connecting with a wireless media output device using different protocols. Other examples include connecting the media output device with the host media playback device with a communication cable. An example user interfaces for connecting to a wireless speaker is illustrated in FIG. 4.

The operation 244 initiates a social playback session. Initiating a social playback session includes generating a social playback session ID. Typically, the host media playback device will call the media delivery system to create a social playback session with the existing playback on the host media playback device. In some examples, the host media playback device sends a request to the media delivery system which generates a social playback session ID and marks the current social playback session as available for other devices to join. The media delivery system sends a message with the session ID and, in some examples, additional social playback session information to the host media device. In other examples, the host media device generates the social playback session ID and initiates the social playback session on the host media playback device. In some examples, i.e. when the audio output device is a Spotify Connect enabled device, the social playback session service creates a session automatically. For example, when a user uses a voice command to start a session at a Spotify Connect enabled device.

The operation 246 broadcasts the social playback session. In some embodiments, the host media playback device will start broadcasting the social playback session after the social playback session is successfully created by the media delivery system. The operation 256 operates by broadcasting a message including information related to the social playback session to other devices in the media playback environment. For example, the operation 246 may include the host media playback device broadcasting a message which includes the session ID. In some examples, broadcasting the social playback session uses BLE technology on the host device to allow other BLE-enabled devices to discover the social playback session. Other examples broadcast the session over a local Wi-Fi® network, for example, using mDNS technology. Broadcasting the social playback session may include allowing devices in range of the network to discover information such as the social playback session name or the name of the media output device. In some examples, broadcasting a message only includes broadcasting the social listening session ID, and only after the guest device is verified is it allowed to see other information, such as information about the user accounts in the session or the media content item being played.

Figure 7:
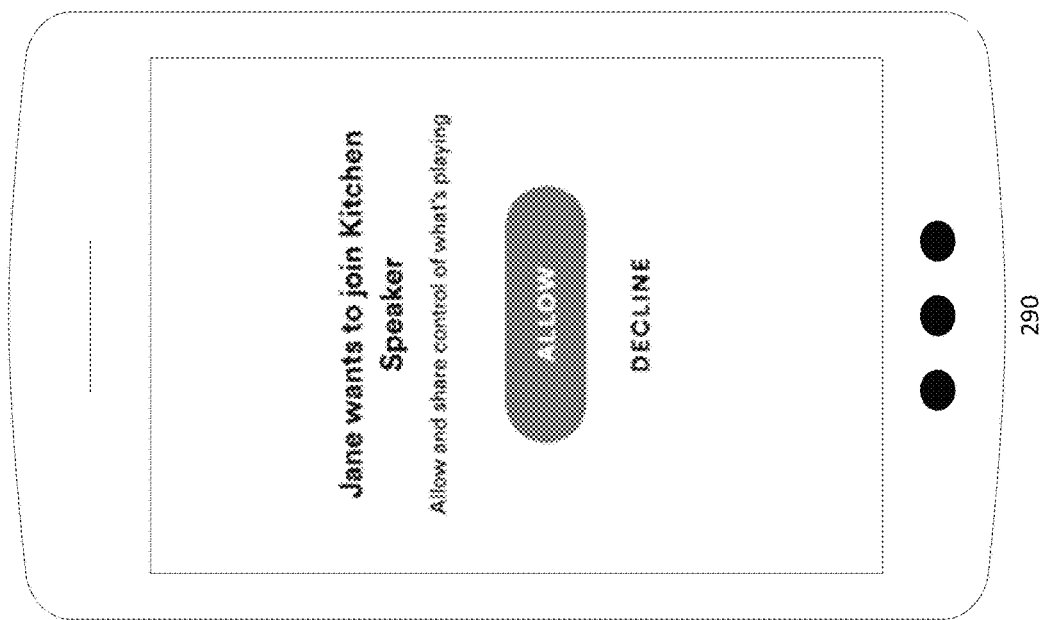
FIG. 7 illustrates an example user interface for providing permission to join a social playback session.

The operation 248 adds a guest device to the social playback session. In some examples, a guest media playback device receives a notification from the broadcasted message which allows a guest user to select an option to join the social playback session. In other examples, the guest media playback device may search for social playback sessions which are discoverable by the guest media playback device. In some examples, the host media playback device must approve the guest media playback device through an authentication process before the guest media playback device is added to the social playback session. An example user interface for approving a guest media playback device is illustrated in FIG. 7.

The operation 250 plays the social playback session media content output. Once the guest media playback device joins the social playback session the device is allowed to control the media playback at the connected media output device. Examples of controlling the media playback include adjusting the output volume, the playback speed, other audio settings, pausing audio output, playing audio output, selecting a current media content item, and adding media content items to a queue. Typically, the guest media playback device is not allowed to pair a new media output device to the social playback session or unpair the original media output device. However, in some examples the host user can configure the social playback session to allow guest media playback devices to perform these actions.

FIG. 4 illustrates example user interfaces 252 and 254 for connecting a media playback device to a wireless speaker. In some examples the user interfaces 252 and 254 are displayed on the user interface for a host media playback device.

The user interface 252 illustrates a display for a media playback device which is not connected to a wireless speaker. In the example shown, a user can select a device, in this case "Bluetooth speaker", at the selection 262. The media playback device will attempt to pair with the wireless speaker after the user makes the selection 262.

The user interface 252 displays a media playback device which is connected to a wireless speaker. In this example, the user interface 254 is displayed when the media output is produced, at least in part, by the "Bluetooth from this phone" (264).

Figure 5:
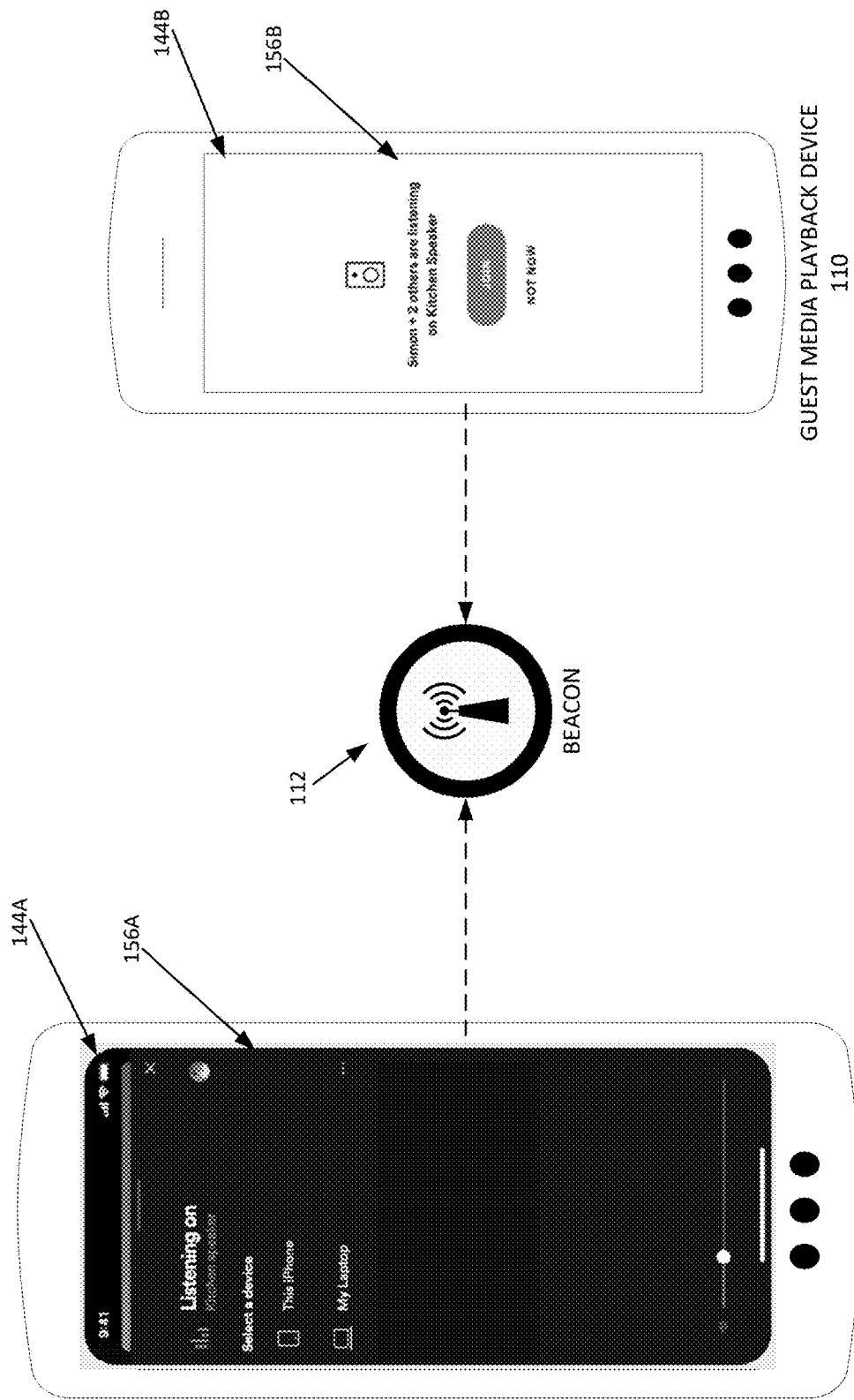
FIG. 5 is a schematic illustration of broadcasting a social playback session.

FIG. 5 is a schematic illustration of broadcasting a social playback session. The host media playback device 108 broadcasts a message 112 which is discoverable by the guest media playback device 110.

The host media playback device 108 broadcasts a message 112 which allows other devices to join a social playback session. In some embodiments, the host media playback device 108 contains the same components as the example media playback device 140 illustrated and described in FIG. 2. In this embodiment, the host media playback device includes a touch screen 144A. In some examples, the touch screen 144A is similar to the touch screen 144 described in FIG. 2.

The touch screen 144 displays a user interface 156A. In some embodiments, the user interface 156A is similar to the user interface 156 described in FIG. 2. In some embodiments, the host media playback device 108 sends a request to a media content delivery system to initiate a social playback session and receive a social playback session ID in response to the request. The host media playback device broadcasts the message 112 including the social playback session ID to initiate the social playback session. In some examples, the host media playback device includes a toggle switch UI which enables social playback functionality. For example, when the user toggles social playback to "enabled" the system automatically broadcasts the social listening session when the host media playback device connects to a remote media output device.

The message 112 is broadcast to allow one or more devices to discover the social playback session. In some embodiments, the message 112 is broadcast using Bluetooth® Low Energy technology. Other wireless broadcasting methods are also possible. For example, in some embodiments the message 112 may be broadcast over Wi-Fi®, using a technology like mDNS. The message 112 includes information which allows the guest media playback device 110 to join a social playback session. In some examples, the message may just include an account ID of the host device, when the guest media playback device discovers the account ID the guest user can decide if they want to join the social playback session. In other examples, the message may include a session ID. The guest media playback device may send a message with the session ID to a media delivery system which can provide additional information or start an authentication process. Other information which may be included in the message include the host playback device name, host playback device type, media output device name, media output device type, account users name, current track playing, or any other information related to the social playback session.

In some embodiments, the message 112 exposes information which guest media playback devices are able to discover and use in order to request and join the social playback session. In other examples, the message 112 triggers a notification on local guest media playback devices. In some examples, the message exposes information which is discoverable by guest media playback devices in proximity and searching for social playback sessions.

The guest media playback device 110 discovers the message 112. For example, the guest media playback device may be able to discover a message with the social playback session ID, which is broadcast, or exposed, from the host media playback device. In some embodiments, the guest media playback device 110 is similar to the media playback device 140 as illustrated in FIG. 2. The guest media playback device 110 includes a touch screen 144B and a user interface 156B. In some examples, the touch screen 144B and the user interface 156B are similar to the touch screen 144 and the user interface 156 as illustrated in FIG. 2. In the example shown, the user interface 156B displays an option that allows the guest user to join or not join the social playback session. In some examples, the option is displayed as a visual, or audible notification. In other examples, the guest user searches and selects a social playback session in order to join the social playback session, as shown in FIG. 6.

Figure 6:
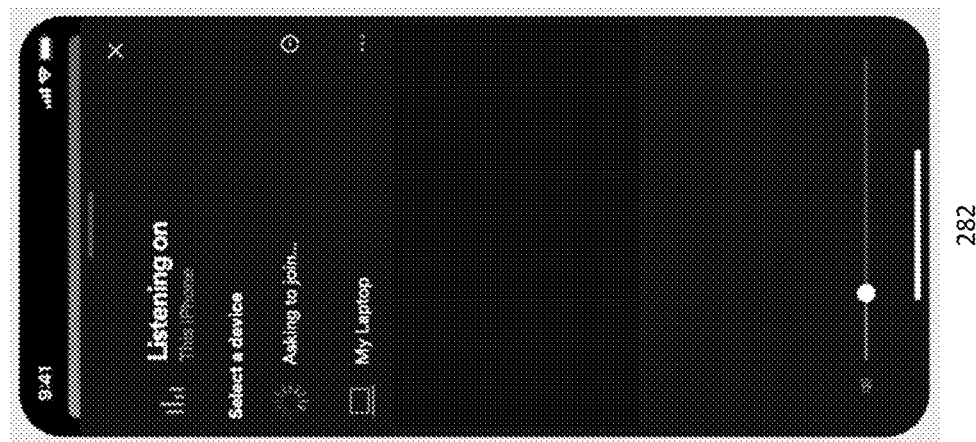
FIG. 6 illustrates example user interfaces for joining a social playback session.
Figure 6:
Figure 6:
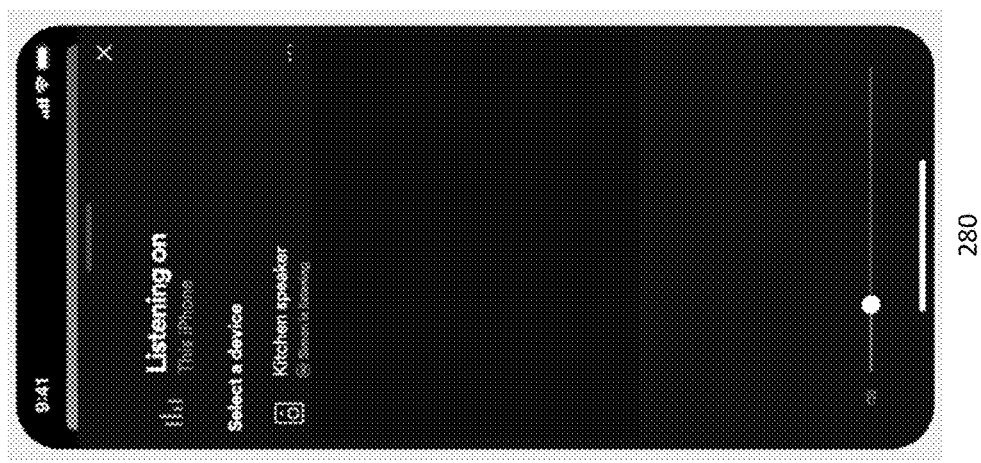

FIG. 6 illustrates example user interfaces for joining a social playback session. The example user interface includes user interfaces 280 and 282 which are presented to a user searching for a social playback session. In some examples, the user interfaces 280 and 282 are presented on the guest media playback device 110 illustrated in FIGS. 1 and 5.

The user interface 280 is presented when a user is searching for local devices and or local social playback sessions. In the example shown the user interface 280 shows a local device "Kitchen speaker" and a host user which is paired with the kitchen speaker. In some examples, the information presented is discovered from the host media playback device broadcasting, over BLE or Wi-Fi® or a combination of both, a message.

In the embodiment shown, when the user selects the "Kitchen speaker" the user interface 282 is presented to the guest user. The user interface 282 indicates that the guest device is asking to join the social playback session. In some examples, the user interface 282 is presented to the guest user while the host user performs a verification process for adding the guest to the social playback session.

FIG. 7 illustrates an example user interface 290 for giving a guest media playback device permission to join a social playback session. In this example the host media playback device 108 receives a notification to accept a guest to join the social playback session. In the example shown the host user selects an option to either allow or decline the new guest. In some examples, if the host selects the input to allow the guest media playback device to join the social playback session the guest media playback device will be allowed to control the media output content played at the media output device connected to the host media playback device.

In other examples, a user may automatically be allowed to join the social playback session. For example, a guest media playback device which is on the same Wi-Fi® is automatically be allowed to join a social playback session in some examples. Similarly, if the account logged in on the host media playback device and account logged in on the guest media playback devices are linked (for example, following each other, or friends with each other) than the guest media playback device can be allowed to join automatically. In some examples, the social playback session service may determine the location of the both the host media playback device and the guest media playback device and determine whether the guest media playback device is able to connect automatically. The user of the host media playback device configures the settings for allowing a guest device to join a social playback session.

Figure 8:
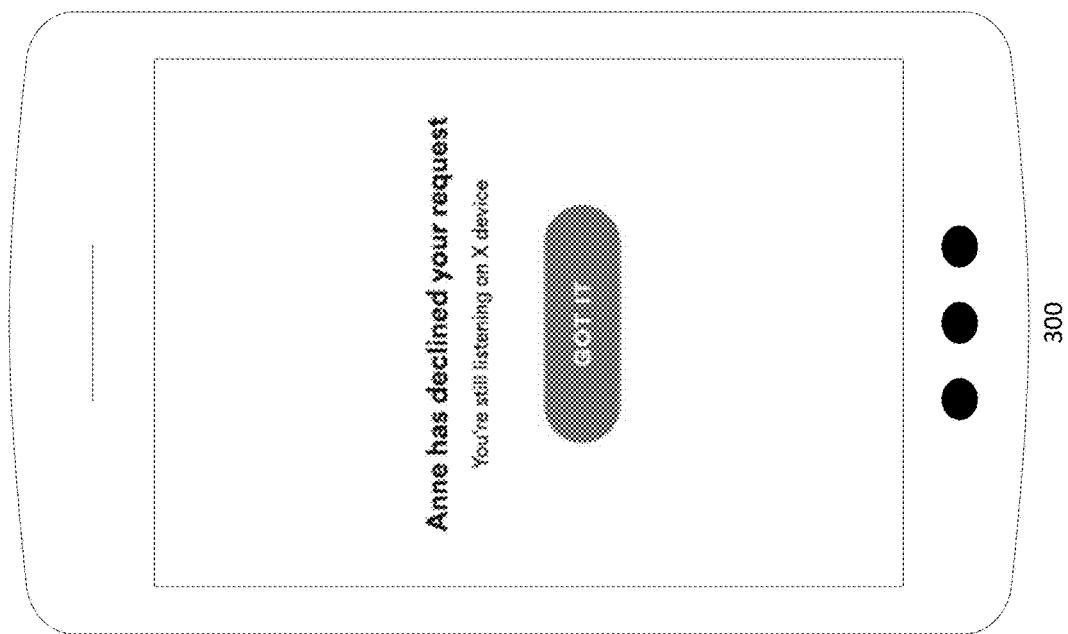
FIG. 8 illustrates an example user interface for notifying a user that the request to join a social playback session is declined.

FIG. 8 illustrates an example user interface 300 for notifying a guest that a host has declined the request to join the social playback session. In some examples, the user interface 300 will display on the guest media playback device to notify the guest that the host has declined the request to join the social playback session. In this example, the user interface also includes a note indicating that the guest media-playback device is providing media content output "on X device." In other examples, a message explaining why the host declined the request is presented or an option to try requesting to join again can be displayed.

Figure 9:
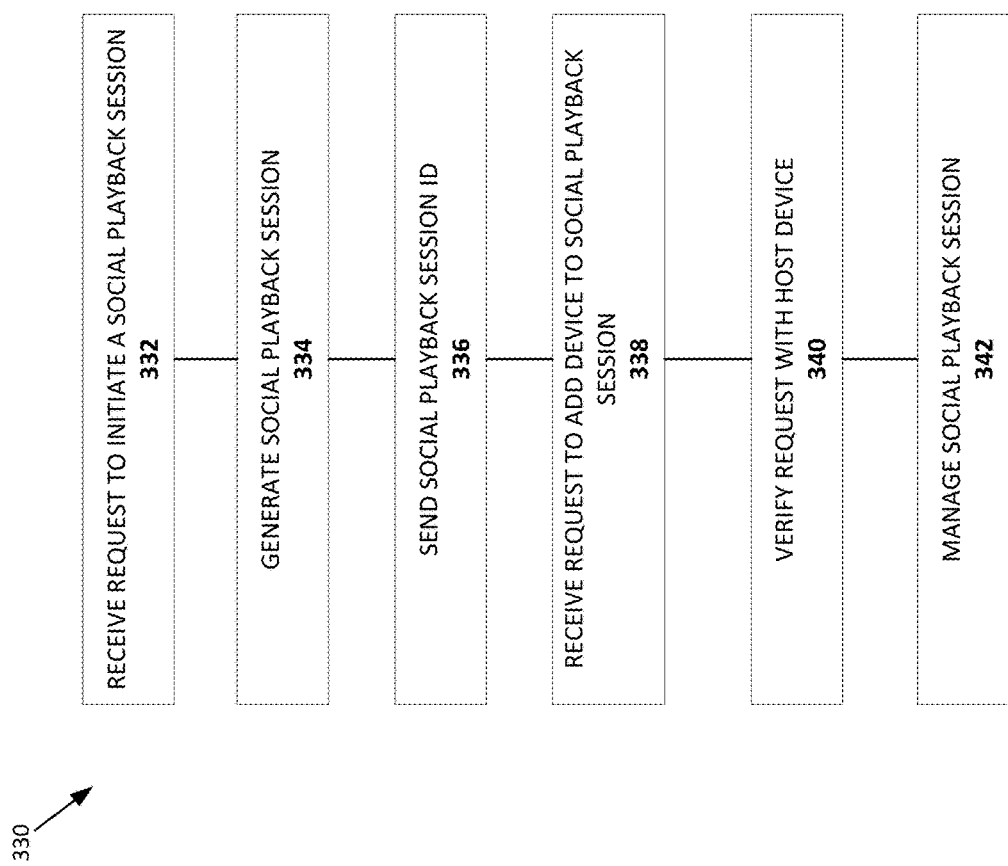
FIG. 9 illustrates an example method of managing a social playback session.

FIG. 9 illustrates an example method 330 of managing a social playback session. In some examples, the method 330 is performed using the media delivery system 104 illustrated in FIG. 2. In other examples, the method 330 is executed on the host media playback device, as shown in FIG. 15. The method 330 includes the operations 332, 334, 336, 338, 340, and 342.

The operation 332 receives a request to initiate a social playback session. In some examples, the social playback session application includes a social playback interface that operates to communicate with the host media playback device to receives a request to initiate a social playback session.

The operation 334 generates a social playback session. In some examples, a social playback service generates a social playback session ID. In some embodiments, the social playback service marks the session as available for social playback. For example, the social playback session associated with the social playback session ID is marked to indicate the session is available for guests to join. Other embodiments generate a social playback session with other social playback information. For example, the social playback session service can generate a social playback queue, playlist, guest permissions, and audio or video settings. In some examples, the social playback session application does not know about the existence of a media output device (for example, the social playback session application may only be aware of the host media playback device and is unaware of an external speaker). In some embodiments, the social playback session information, such as session ID and devices in the session, is stored in a social listening data store on the media delivery system.

The operation 336 sends the social playback session ID. In some embodiments, the media delivery system uses the social playback session interface to send a message to the host media playback device which includes the session ID. In some examples, the message includes additional social playback session information.

The operation 338 receives a request to add a guest user account to the social playback session. In some embodiments, the social playback application receives a request to join a social playback session from a guest media playback device communicating with the social playback session application using the social playback session interface. In some examples, the social playback session service may check the received social playback session ID to determine if the social playback session is available to accept guests.

The operation 340 verifies the request to add a guest media playback device to the social playback session. After a guest media playback device requests to join a social playback session the social playback service will perform an authentication process of the guest media playback device. In some embodiments, the social playback service will automatically join the guest media playback device based on one or more indicators that the guest media playback device is trusted to join the social playback session. For example, the social playback service may determine that the guest device is on the same Wi-Fi® network as the host device, indicating that the host device trusts the guest device with the Wi-Fi® password, and automatically add the guest media playback device. Other indications of trust include when both devices are logged into corresponding accounts which are linked to each other (for example, two accounts which follow each other) and receiving location form each device which indicates the devices are in the same location. In some embodiments, the host user can configure different settings for authenticating a guest media playback device.

The operation 342 manages a social playback session. In the typical example, the operation 342 is performed by a playback service. In some examples, managing a social playback session includes syncing playback information across media playback devices, controlling the playback at the host media playback device, managing social playback configurations and permissions. Managing a social playback session allows guest devices to send messages to the media delivery system which performs operations to control the playback at the host media playback device. In some embodiments, managing a social playback session includes facilitating passing off a media output device from the host media playback device to a guest media playback device, either automatically or in response to a request from a device. In some examples, the host user can remove some or all of the guest users from the social playback session.

Figure 10:
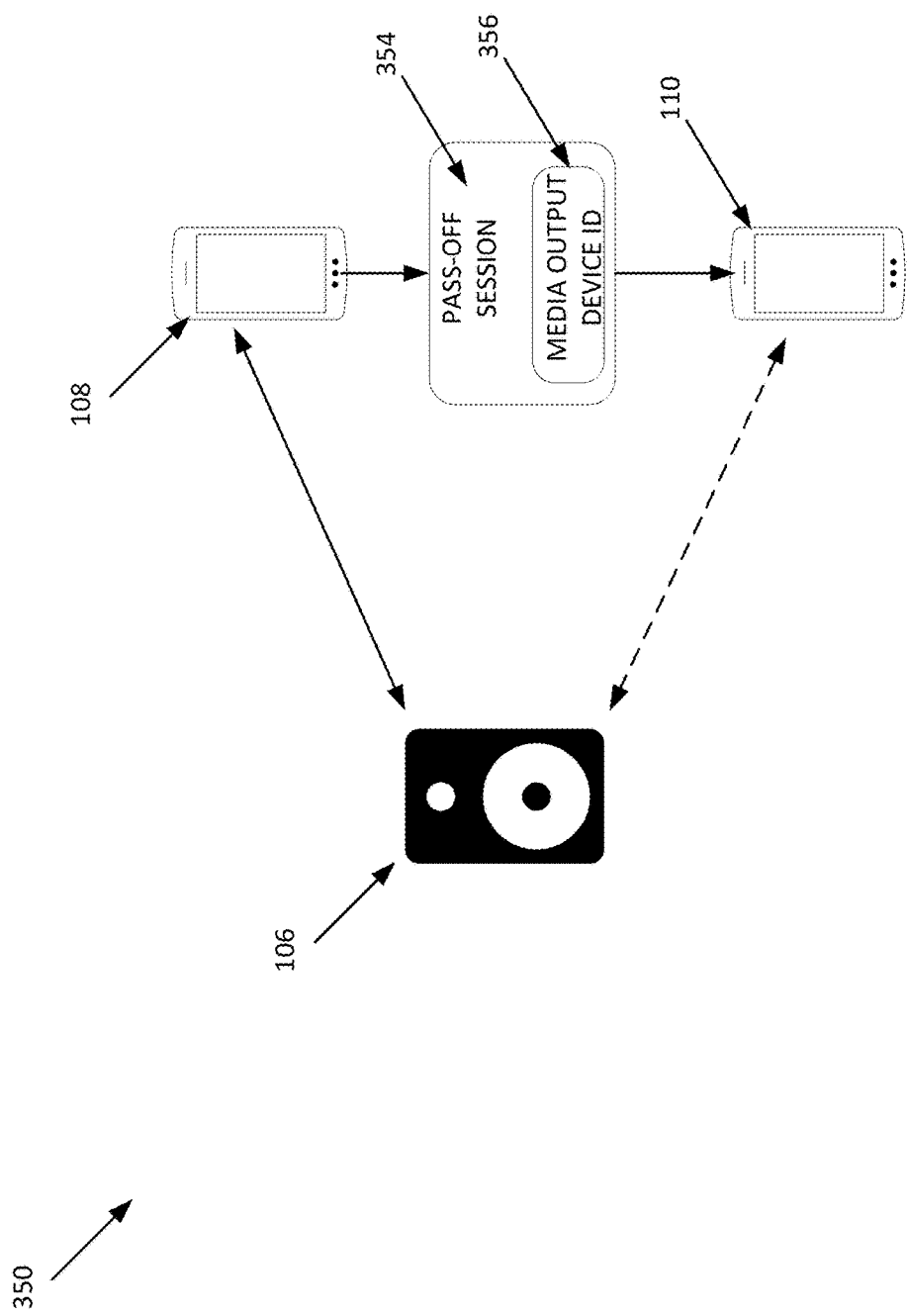
FIG. 10 illustrates an example system for transferring a media output device connection.

FIG. 10 illustrates an example system 350 for transferring a media output device connection from the host media playback device to the guest media playback device. The system 350 includes a media output device 106, a host media playback device 108, a guest media playback device 110, a pass-off session service 354. The pass-off session service includes a media output device ID 356 associated with the media output device 106.

The media output device 106 is similar to the media output device 106 illustrated in FIG. 1. In some examples, the media output device 106 is a wireless media output device which is paired to the host media playback device 108. In some examples, the media output device 106 is not discoverable or is not joinable when it is paired to the host media playback device 108.

Figure 12:
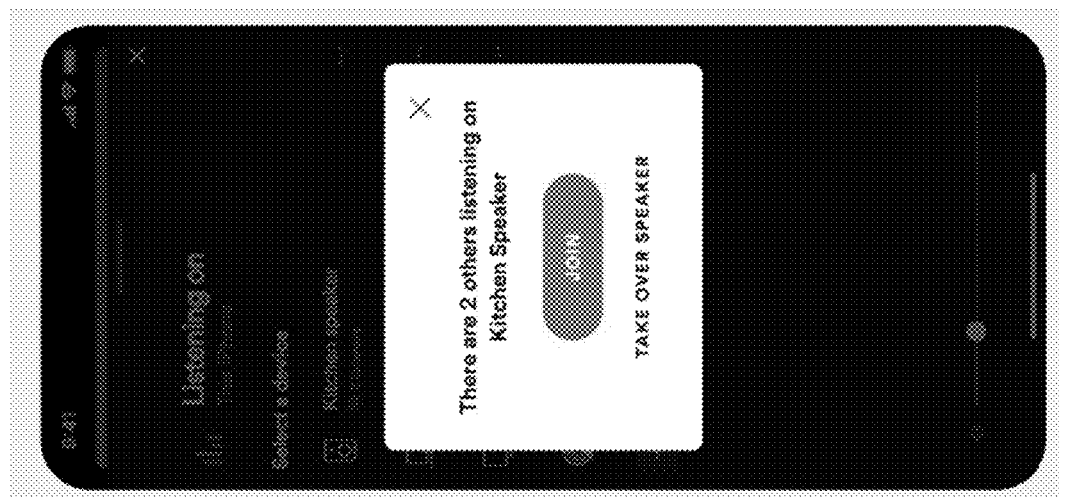
FIG. 12 illustrates an example user interface for transferring a media output device connection.

The host media playback device 108 and the guest media playback device 110 are similar to the host media playback device 108 and guest media playback device 110 illustrated in FIG. 1. In some examples, the host device may disconnect from the media output device 106 without ending the social playback session. For example, the host user may decide may wish to leave the media playback environment, but guest users may wish to continue the social playback session. In this example, the host media playback device disconnects from the media output device connection and the guest media playback device 110 connects to the media output device. In some examples, the guest media playback device 110 may automatically connect with the media output device 106. In other examples, the guest media playback device 110 is prompted to connect to a media output device 106 using a pairing process, for example, a Bluetooth® pairing process. In some examples, the host media playback device 108 may disconnect unexpectedly. For example, the host media playback device 108 may lose connection with the media output device due to interference with the wireless connection, or the host media playback device 108 could run out of power. In some of these examples, the guest media playback device 110 may automatically pair and connect with the media output device 106. In some examples, this is done so the social playback session continues with minimal or no interruptions. Additionally, the session may automatically be terminated. In some examples, a guest media playback device sends a request before joining a social playback session, as shown in the example of FIG. 12.

The pass-off session service 354 operates to facilitate the transfer of the wireless media output device connection. In some examples, the service 354 is only available with media output devices enabled with transfer technology. For example, a Spotify Connect enabled device. In some examples, the pass-off session service 354 is executed on the media delivery system 104 as illustrated in FIG. 1. In other examples, the pass-off session service 354 is executed on the host media playback device 108 and the guest media playback device 110. The pass-off session service 354 transfers the connection by sending the media output device ID 356 to the guest media playback device 110. In some examples, the host media playback device 108 sends the media output device ID 356 and in other examples the media output device ID 356 is sent from a media delivery system. An example method of transferring a media output device connecting to a guest device is illustrated and described in reference to FIG. 11.

Figure 11:
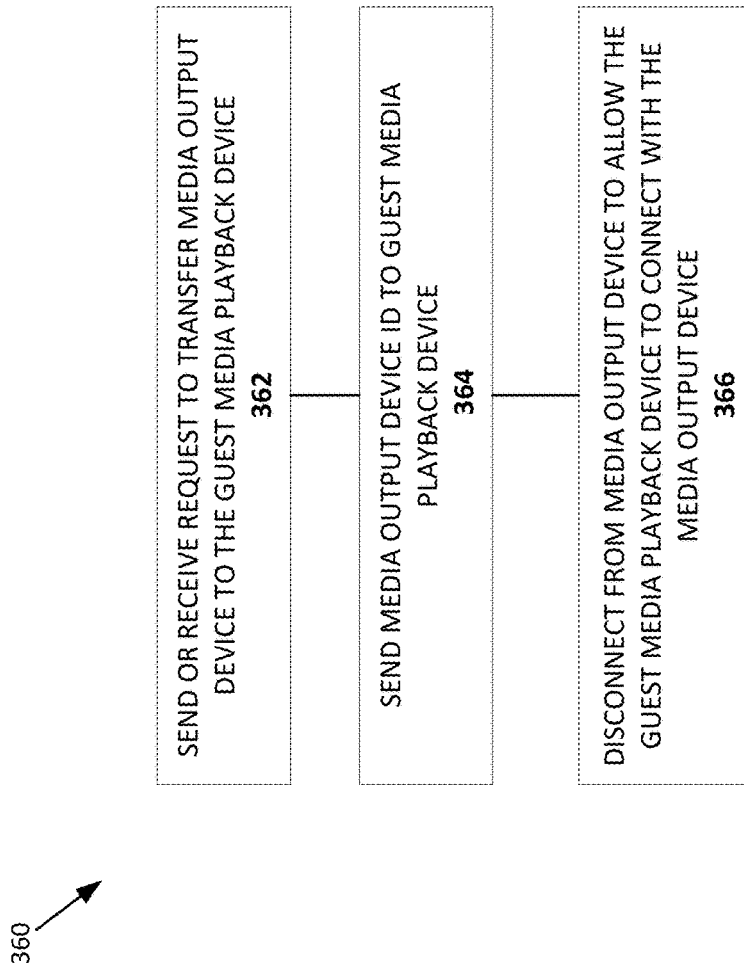
FIG. 11 illustrates an example method for transferring a media output device connection.

FIG. 11 illustrates an example method 360 for transferring a media output device connection from a host media playback device to a guest media playback device. In some examples, the method 360 is performed by the host media playback device, for example, the host media playback device 108 illustrated in FIG. 1. In other examples, the method 360 is performed by the media delivery system 104 illustrated in FIG. 1. The method 360 includes the operations 362, 364 and 366.

The operation 362 sends or receives a request to transfer a wireless media output device connection to a guest media playback device. In some examples, the host media playback device sends a request to one or more guest devices in the social playback session to connect with the media output device. For example, the host media playback device can send the request to the guest media playback device or the media delivery system to notify the guest media playback device. In other examples, a guest user will request to take over the media output device by sending a request to the host device or the media delivery system.

The operation 364 sends the media output device ID to one or more guest media playback devices. The operation 364 can also include sending any other information to a guest media playback device which assists the guest device in connecting to the wireless media output device. In some examples, the media delivery system may determine that the host media playback device has lost connection with a media output device and automatically send the media output device ID to the guest media playback device.

The operation 366 disconnects from the wireless media output device to allow the second media playback device to connect with the wireless media output device. After the guest media playback device receives the media output device ID the host device will disconnect from the wireless media output device and the guest media playback device will perform the operations to connect with the wireless media output device. In some examples, the host disconnecting from the wireless media output device may initiate the pass of service.

In some examples the host media playback device disconnects unexpectedly and will either send the media output device ID to one or more guest media playback devices or a media delivery system managing the social playback session will send the media output device ID to one or more guest devices. A guest media playback device may automatically connect to the media output device after receiving the media output device ID and will take over the role as the host device.

FIG. 12 illustrates an example user interface 380 for transferring a media output device connection. The example shown, includes a user interface 380 presented on a guest media playback device to allow the guest media playback device to take over the media output device for a social playback session. In this example a user joining a social playback session is presented with the option to take over the media output device. In some examples, this may be an option when the original host of the social playback session provides a specific configuration. In other examples, a guest media playback device is able to take over a media output device by default.

Figure 13:
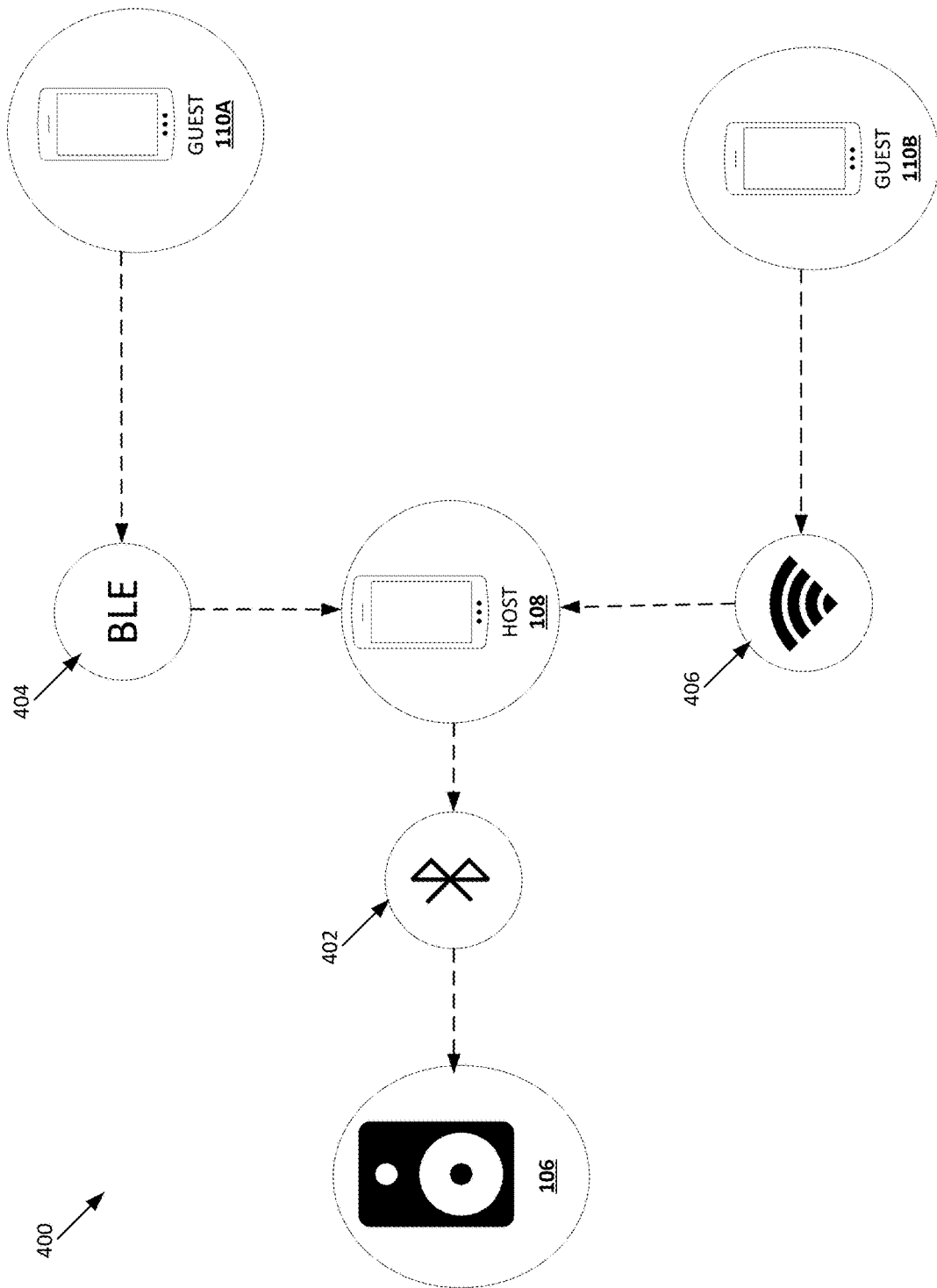
FIG. 13 illustrates an example device discovery for a social playback system.

FIG. 13 illustrates an example device discovery for a social playback system 400. The system 400 includes a media output device 106, a host media playback device 108, a first guest media playback device 110A, a second guest media playback device 110B.

The system 400 is another example of the system 100 illustrated in FIG. 1. In the example of system 400 there are two guest media playback devices 110A, and 110B. The media output device 106 is wireless connected to the host media playback device using a Bluetooth® protocol 402. The host device broadcasts a message that allows both of the guest playback devices 110A and 110B discover the social playback session.

In this example, the first guest media playback device 110A discovers the social playback session using a BLE network 404. In some embodiments, the first guest media playback device 110A operates similar to the guest media playback device 110, illustrated in FIG. 1. In some examples, the first guest media playback device is not connected to the Wi-Fi® network 406. For example, the host may not wish to give the first guest users the credentials to login to a local Wi-Fi®. The host may still share the social playback session with the first guest media playback device 110A using BLE technology. For example, the host media playback device can be configured to broadcast a message using BLE, which is discoverable by the first guest media playback device 110A. Other wireless network technologies can also be used.

In the example shown, the second guest media playback device 110B discovers the social playback session over a Wi-Fi® network 406. The second guest media playback device 110B generally operates like the guest media playback device 110 illustrated in FIG. 1. In this example, the host media playback device is configured to also broadcast the social playback session over the Wi-Fi® network 406, which is discoverable by other devices on the Wi-Fi® network.

In other examples the host media playback device may be configured to broadcast the social playback session over one of or both BLE and Wi-Fi®. In other examples, other local network technologies are used instead of or in addition to BLE and Wi-Fi®. In some examples, the social playback session service is configured to use different authentication methods depending on which network is used to discover the social playback session. For example, the first guest media playback device 110A may need to be verified by the host user and the second guest media playback device is automatically verified.

Figure 14:
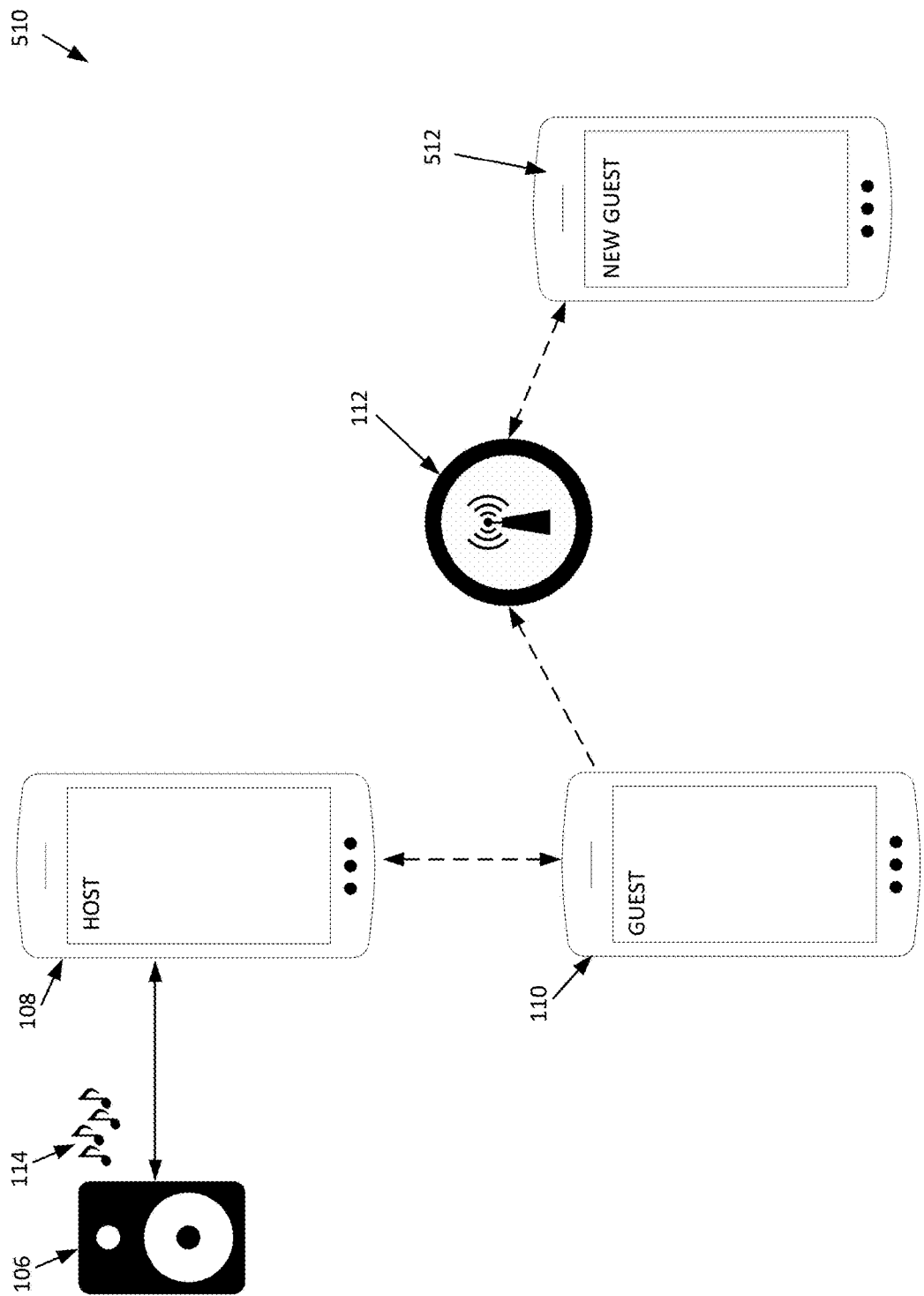
FIG. 14 illustrates an example device discovery for a social playback system.

FIG. 14 illustrates an example device discovery for social a playback system 510. The system 510 includes a media output device 106 which provides the media content output 114, a host media playback device 108, a guest media playback device 110, a message 112, and a new guest media playback device 512.

In the example system 510 the media output device 106, the host media playback device 108 and the guest media playback device 110 are similar to the media output device 106, the host media playback device 108 and the guest media playback device 110 as illustrated in FIG. 1. Referring to FIG. 14, a social playback session is established, and the guest media playback device is already a participant in the social playback session. Accordingly, in the system 510 both the host media playback device 108 and the guest media playback device 110 control the media content output 114 as previously described.

In some embodiments, the host media playback device continues to broadcast a message after the guest media playback device 110 joins the social playback session. In other embodiments, the host media playback device will stop broadcasting the message after the guest media playback device joins the social playback session. For example, the host media playback device may stop broadcasting the message to allow the ubiquitous social session joinability to extend in a specific direction (for example, a Bluetooth® chain of devices may extend to a certain direction or area).

In the system 510 the guest media playback device 110 broadcasts a message corresponding to the active social playback session. In some examples, immediately after guest media playback device 110 joins the social playback session initiated by the host media playback device 108 the guest media playback device automatically starts broadcasting the same session information as was broadcast by the host media playback device. In other examples, the guest user of the guest media playback device 110 must select an input to start broadcasting the message 112. In further examples, the host user configures whether the guest media playback device 110 has permission to broadcast a message 112 for the social playback session. In some examples, the guest media playback device 110 will broadcast the message 112 using BLE technology, a Wi-Fi® technology, or both.

In the embodiment shown, the new guest media playback device 512 discovers the social playback session by discovering the message 112. The new guest media playback device 512 joins the social playback session using a similar process as described for the guest media playback device 110 herein. Once the new guest media playback device joins the social playback session the new guest media playback device is able to control the media content output 114 through the host media playback device 108. In some examples, after the new guest media playback device 512 joins the social playback session it will start broadcasting a similar message to the message 112.

FIG. 15 illustrates an example host media playback device 108 executing a social playback session application 116. In this embodiment, the media delivery system is optional for initiating and managing a social playback session because the host media playback device is able to execute locally the social playback session application 116. The social playback session application 116 includes a social playback session interface 218, a social playback session service 220 and a social playback session data store 222, each of which perform similar actions as described in FIG. 2.

As used herein, the term "engine" is applied to describe a specific structure for performing specific associated functions, such as a special purpose computer as programmed to perform algorithms (e.g., processes) disclosed herein. The engine can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

Where data structures are referred to, the data structure can be stored on dedicated or shared computer readable mediums, such as volatile memory, non-volatile, transitory, or non-transitory memory.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method of controlling a media output device, the method comprising:
   connecting a first media playback device to the media output device;
   initiating, from the first media playback device, a social playback session;
   controlling the media output device to output a media content item;
   broadcasting a message for the social playback session, from the first media playback device, to permit a second media playback device to discover and join the social playback session when the second media playback device is in proximity to the first media playback device; and
   adjusting at least one playback control based on commands from the second media playback device.

2. The method of claim 1, wherein initiating the social playback session further includes:
   sending a request from the first media playback device to a media delivery system to generate a session ID;
   receiving the session ID from the media delivery system; and
   wherein the message further includes the session ID.

3. The method of claim 2, wherein the first media playback device uses a first network to communicate with the media delivery system and a second network to broadcast the message.

4. The method of claim 3, further comprising automatically approving the joining of the second media playback device to the social playback session when the second media playback device is connected to the first network.

5. The method of claim 1, wherein prior to joining the second media playback device to the social playback session, receiving at the first media playback device a request to approve the joining of the second media playback device to the social playback session.

6. The method of claim 1, further comprising:
sharing a media output device ID with the second media playback device, wherein the media output device ID allows the second media playback device to initiate a connection with the media output device when the first media playback device disconnects from the media output device.

7. The method of claim 1, wherein the first media playback device is associated with a first user account and the second media playback device is associated with a second user account.

8. The method of claim 1, wherein the message is further configured to display a notification on the second media playback device when the second media playback device discovers the message.

9. The method of claim 1, wherein broadcasting the message is done over at least one of a Bluetooth® network and a Wi-Fi® network.

10. The method of claim 1, wherein the second media playback device sends commands to adjust the at least one playback control without connecting to the media output device.

11. A system for controlling a media output device, the system comprising:
a media output device; and
a first media playback device including a memory storage device, the memory storage device storing instructions that, when executed by the computing device, cause the computing device to:
connect the first media playback device to the media output device;
initiate a social playback session;
control the media output device to output a media content item;
broadcast a message for the social playback session, from the first media playback device, to permit a second media playback device to discover and join the social playback session when the second media playback device is in proximity to the first media playback device; and
adjust at least one playback control based on commands from the second media playback device.

12. The system of claim 11, wherein the instructions when executed by the first media playback device further cause the first media playback device to:
send a request to a media delivery system which generates a session ID;
receive the session ID from the media delivery system;
wherein the message further includes the session ID; and
wherein the commands from the second media playback device are sent from the second media playback device to the media delivery system.

13. The system of claim 12, wherein the first media playback device uses a first network to communicate with the media delivery system and a second network to broadcast the message.

14. The system of claim 13, wherein the second media playback device is automatically approved to join the social playback session when the second device is connected to the first network.

15. The system of claim 11, wherein the instructions when executed by the first media playback device further cause the first media playback device to:
receive a request to approve the joining of the second media playback device to the social playback session.

16. The system of claim 11, further comprising:
sharing a media output device ID with the second media playback device, wherein the media output device ID allows the second media playback device to initiate a connection with the media output device when the first media playback device disconnects from the media output device.

17. The system of claim 11, wherein the second media playback device broadcasts a message for the social playback session to permit additional media playback devices to discover and join the social playback session.

18. A method of controlling a media output device, the method comprising:
receiving a request to generate a social playback session from a first media playback device, wherein the first media playback device is connected to the media output device;
generating the social playback session and a session ID;
sending the session ID to the first device allowing the first device to broadcast a message, for the social playback session, to permit devices in proximity to the first media playback device to discover and join the playback session, wherein the message includes the session ID;
receiving a request, including the session ID, to join the social playback session from a second media playback device after the second media playback device discovers the message; and
receiving commands from the second media playback device including at least one playback control and sending the commands to the first media playback device causing the first media playback device to adjust the at least one playback control.

19. The method of claim 18 further comprising:
syncing the social playback session between the first media playback device and the second media playback device by sending messages updating the status of the social playback session to the first media playback device and the second media playback device.

20. The method of claim 18, wherein the controls further include at least one of:
(1) a volume control;
(2) a pause media content item control;
(3) a play media content item control;
(4) a media content item selection;
(5) a media content item addition to a queue;
(6) a next song control;
(7) a previous song control; and
(8) a playback context control.

21. The method of claim 18, further comprising:
determining that the first media playback device is disconnected from the wireless media output device; and
sending a media output device ID to the second media playback device allowing the second media playback device to connect with the media output device.

* * * * *